United States Patent [19]

Short

[11] Patent Number: 4,788,106
[45] Date of Patent: Nov. 29, 1988

[54] SILOXANE-POLYESTER COMPOSITIONS

[75] Inventor: Anthony G. Short, Llandaff, Wales

[73] Assignee: Dow Corning, Ltd., Barry, Wales

[21] Appl. No.: 153,613

[22] Filed: Feb. 8, 1988

[30] Foreign Application Priority Data

Feb. 14, 1987 [GB] United Kingdom ................ 8703491
May 19, 1987 [GB] United Kingdom ................ 8711813

[51] Int. Cl.$^4$ ............................................. B32B 9/04
[52] U.S. Cl. .................................... 428/447; 427/387;
528/16; 528/17; 524/301; 524/398; 524/394;
524/399; 524/758; 524/783
[58] Field of Search ............... 524/301, 394, 399, 398,
524/785, 783; 528/16, 17; 427/387; 428/447

[56] References Cited

FOREIGN PATENT DOCUMENTS 100623 7/1983 European Pat. Off. .
127934 4/1984 European Pat. Off. .

Primary Examiner—Melvyn I. Marquis
Attorney, Agent, or Firm—Alexander Weitz

[57] ABSTRACT

A curable composition comprising (A) a siloxane-polyester copolymer, (B) one or more solvents for the siloxane-polyester copolymer, (C) a silane having silicon-bonded alkoxy or alkoxy-alkoxy groups and a silicon-bonded substituent containing an epoxy group, (D) aluminium acetylacetonate and (E) a tetraalkyl titanate.

The compositions are heat-curable and are useful for the formation of protective and decorative coatings on substrates such as metals and plastics.

6 Claims, No Drawings

SILOXANE-POLYESTER COMPOSITIONS

This invention relates to compositions comprising siloxane-polyester copolymers and to the use of such compositions for coating substrates.

Compositions based on copolymerisation products of siloxanes and polyesters have been known and used for many years. Such siloxane-polyesters have found application mainly in coating compositions, particularly in protective and decorative paints for metals such as mild steel and aluminium. Although compositions based on such copolymers are relatively successful from a commercial and technical standpoint they require baking for long periods (e.g. 1-2 hours) and/or at high temperatures (e.g. 250° C.) in order to achieve a cured coating having optimum hardness and abrasion resistance. There has thus existed a need for improved siloxane-polyester compositions which can be cured employing milder conditions without sacrificing the desired properties in the cured coating.

In our European patent application No. 100 623 there are described and claimed siloxane-polyester compositions comprising (1) a siloxane-polyester copolymer resin, (2) one or more solvents for the copolymer resin, (3) a silane having a silicon-bonded amino group and silicon-bonded alkoxy or alkoxyalkoxy groups and (4) a titanium chelate. Such compositions can be cured at relatively low temperatures and in a relatively short time e.g. 150° C. for 30 minutes. However, they suffer from the drawback that yellowing of the cured film can occur under certain conditions. Siloxane-polyester compositions have also been disclosed in European patent application No. 127 934, said compositions comprising (1) a siloxane-polyester copolymer resin, (2) one or more solvents for the copolymer, (3) a silane having a substituent which contains an epoxy group and (4) a titanium chelate which is a dialkoxytitanium bis-(acetylacetonate) and/or a dialkoxytitanium bis-(ethylacetoacetate). Although the compositions disclosed in E.P. No. 127 934 exhibit good curing characteristics and reasonable resistance to yellowing there has remained a desire for a further improvement in the latter property.

According to the present invention there is provided a composition which comprises (A) a siloxane-polyester copolymer resin having on average at least two $\equiv$SiOM and/or $\equiv$COH groups per molecule, wherein M represents a hydrogen atom or an alkyl group having from 1 to 4 carbon atoms, (B) one or more solvents for the siloxane-polyester copolymer, (C) a silane of the general formula

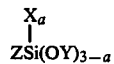

wherein Z represents an organic group composed of carbon, hydrogen and oxygen having therein at least one group of the formula

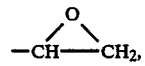

X represents a methyl or a phenyl group, Y represents an alkyl or an alkoxyalkyl group having less than 5 carbon atoms and a has a value of 0 or 1, (D) aluminium acetylacetonate and (E) a tetraalkyl titanate.

The siloxane-polyesters (A) employed in the production of the compositions of this invention can be prepared by known procedures. They are generally prepared by preforming the siloxane and polyester precursors and thereafter heating these together in the presence of a suitable solvent. As the siloxane precursor there can be used low molecular weight organosiloxanes having silicon-bonded groups reactive with the hydroxyl groups in the polyester precursor. The organic groups in the siloxane are usually lower alkyl e.g. methyl, ethyl and propyl, or phenyl, or mixtures of such groups, preferably methyl and phenyl. The reactive groups in the siloxane are generally hydroxyl, alkoxy or alkoxyalkoxy e.g. methoxy, ethoxy, propoxy and methoxyethoxy. Such organosiloxane precursors are well known and a number are commercially available. They include for example alkoxylated polymers of monophenylsiloxane units, alkoxylated copolymers of monophenylsiloxane and dimethylsiloxane units, alkoxylated copolymers of phenylmethylsiloxane and monomethylsiloxane units, alkoxylated copolymers of phenylmethylsiloxane and monophenylsiloxane units, hydroxylated copolymers of phenylmethylsiloxane and monoethylsiloxane units and hydroxylated copolymers of monophenylsiloxane and monopropylsiloxane units. The siloxane polymer and copolymer precursors can be prepared by known procedures, for example by the hydrolysis and cohydrolysis of the corresponding alkoxysilanes and condensation of the hydrolysis product.

The hydroxyl-containing polyesters which are reacted with the siloxane precursor are also well known materials. They can be obtained by the reaction of one or more aromatic dicarboxylic acids, normally phthalic acid, isophthalic acid or terephthalic acid, or esters and anhydrides thereof with one or more dihydric or polyhydric alcohols having from 2 to 8 carbon atoms, for example ethylene glycol, 1,2-propylene glycol, glycerol, trimethylolpropane, trimethylolethane, pentaerythritol and cyclohexane-dimethanol. If desired a saturated aliphatic dicarboxylic acid may be incorporated into the polyester although such addition is kept to a minimum where maximum hardness in the cured copolymer is required.

During the preparation of the siloxane-polyester the reaction may be expedited by the inclusion of a catalyst such as butyl titanate or propyl zirconate, such catalysts generally being effective in very small amounts. In order to provide for the presence of residual $\equiv$SiOM and/or $\equiv$COH groups in the siloxane-polyester the reaction between the siloxane and polyester reactants should be only carried so far as is consistent with providing the desired proportion of these groups in the copolymer. It is preferred to employ a solvent for the reaction, some of which at least can remain as the, or as part of the, solvent (B) for the siloxane-polyester. The ratios of siloxane and polyester precursors employed in the preparation of the siloxane-polyester will depend upon the balance of properties desired in the copolymer. For example, the copolymer can be prepared employing 15-80% by weight of siloxane and 85-20% by weight of polyester. In general, however, the preferred copolymers are those comprising 35-80% by weight of siloxane and 65-20% by weight of polyester. Examples of siloxane-polyesters which may be employed as ingredient (A) of the compositions of this invention and methods for their preparation are described in U.K. Pat. Nos. 815 107, 1 070 174, 1 346 864 and 1 485 368.

The compositions of this invention contain one or more solvents (B) for the siloxane-polyester. Examples of solvents which can be employed are xylene, toluene, benzene, alcohols e.g. isopropanol and n-butanol, the ethers and esters of ethylene glycol, for example ethylene glycol monoethyl ether, ethylene glycol dimethyl ether, ethylene glycol monoethylether acetate and diethylene glycol monoethylether acetate, hexyl acetate, heptyl acetate and ethylene diglycol acetate. For optimum cure characteristics of the composition the preferred solvents are the ethers of ethylene and propylene glycols, hydrocarbons, e.g. toluene and xylene, and mixtures of these. However, it is beneficial that the compositions also contain a proportion of a lower monohydric alcohol e.g. butanol as this can facilitate the dispersion therein of the aluminium acetylacetonate (D). The alcohol may be present in the siloxane-polyester component but is best incorporated with (C), (D) and (E) as a separate package as hereinafter described. The proportion of solvent employed is not critical and will depend upon the intended use of the compositions. For example, where the compositions are employed to provide very thin coatings on a substrate the solvent may comprise the major proportion of the weight of the composition, for example up to about 85% by weight. Lower proportions of solvent e.g. down to about 20% may be employed where the application calls for a thicker deposition of the siloxane-polyester.

Ingredient (C) of the compositions of this invention is a silane having both a silicon-bonded epoxy-containing group and two or three silicon-bonded alkoxy and/or alkoxyalkoxy groups. In the general formula of the silanes (C) the substituent Z is any epoxidised monovalent organic group composed of carbon, hydrogen and oxygen. Such groups include those represented by the general formula

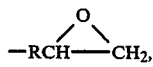

wherein R represents a divalent group e.g. —CH$_2$CH$_2$—, —(CH$_2$)$_3$—, —CH$_2$CH.CH$_3$CH$_2$—, phenylene, cyclohexylene and

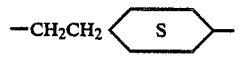

or an ether oxygen-containing group such as —CH$_2$CH$_2$OCH$_2$CH$_2$— and CH$_2$CH$_2$OCH(CH$_3$)CH$_2$—. Preferably Z represents the group

The group Y represents, for example, methyl, ethyl or methoxyethyl. Preferred as ingredient (C) are compounds represented by the formula

wherein each Y represents methyl, ethyl or methoxyethyl. The silane (C) may be employed in a proportion of from about 3% to about 25%, preferably 5% to 18% by weight based on the weight of the siloxane-polyester (A).

Ingredient (D) of the compositions of this invention is aluminium acetylacetonate. This ingredient is present only in minor proportions, preferably from 0.2 to 2.5 percent by weight based on the weight of (A).

The remaining essential ingredient (E) of the composition comprises one or more tetra-alkyl titanates, that is compounds of the general formula Ti(OR)$_4$ wherein R represents an alkyl group, for example ethyl, propyl, butyl and octyl, the preferred titanates being tetrabutyl titanate and tetra-isopropyl titanate. From about 0.25% to about 5% by weight of the titanate (E), based on the weight of siloxane-polyester, is preferably employed. More than 5% by weight of the titanate can be used but no significant further advantage is believed to accrue from the use of such increased proportions.

Preparation of the compositions of this invention is carried out by mixing the ingredients (A) to (E). They may be mixed in any order. In practice the siloxane-polyester copolymer is normally prepared as a solution in one or more organic solvents. In accordance with conventional techniques the solvent content of the solution may be adjusted to the desired level during or following the preparation of the copolymer by the removal or addition of solvent, including the replacement or partial replacement of the original solvent with other solvents. For best results it is preferred that all of ingredients (A) to (E) are not brought together until the composition is required for use. Thus the solvent solution of the silicone-polyester, the silane, the aluminium acetyl acetonate and the titanate may each be packaged separately for storage and shipment and mixed in the desired proportions for use. Or, more conveniently, the composition can be provided as a two package product, the one package comprising the organic solvent solution of the siloxane-polyester copolymer and the other a mixture of the silane (C), the aluminium acetyl acetonate (D) and the titanate (E). When components (C), (D) and (E) are packaged together as a mixture the proportion of such mixture to be added to (A) and (B) can be varied by providing said mixture as a solution in one or more solvents which are the same as or compatible with (B). Conveniently the concentration of active ingredients (C), (D) and (E) in said solution is from about 30% to 70% by weight, commensurate with an addition level based on the siloxane-polyester (A) of approximately 12% to 30% by weight.

The compositions of this invention are particularly adapted for the formation of protective and decorative coatings on metals e.g. steel, aluminium and copper, plastics e.g. acrylics and polycarbonates, and other substrates, to which they may be applied employing any appropriate technique, for example brushing, spraying, dip coating, roller coating and flow coating. They may be employed as clear coating materials or may be dyed or pigmented to any desired colour. Thin films of the composition may be cured to hard, adherent abrasion resistant coatings at temperatures as low as about 120° C., preferably from about 130° C. to 180° C., whereas siloxane-polyester compositions not containing (C), (D) and (E) generally require a cure temperature of at least 200° C. to produce comparable coatings in a practicable time.

The following examples, in which the parts are expressed by weight, illustrate the invention.

EXAMPLE 1

γ-glycidoxypropyl trimethoxysilane (36 parts), aluminium acetyl acetonate (3 parts) and tetraisopropyl titanate (2.1 parts) were mixed and the mixture added with stirring to a mixed solvent system consisting of toluene (17.5 parts) and n-butanol (41.4 parts). A portion (20 parts) of the resulting solution was then thoroughly mixed into 100 parts of a 60 percent by weight solvent solution (50/50 butyl cellosolve and xylene) of a siloxane-polyester copolymer. The copolymer had been prepared by the reaction of a methylphenyl siloxane with dimethylterephthalate and trimethylolpropane and contained 5.5% weight of available hydroxyl groups.

The siloxane-polyester solution thus obtained was applied by dip coating or spraying to degreased panels of glass and aluminium. The coated panels were allowed to air dry for approximately 10 minutes. Some of the panels were then placed in an air circulating oven at 150° C. for 90 minutes to cure the applied coating. When tested for solvent and abrasion resistance the cured coating withstood 200 double rubs with a cloth soaked in methyl ethyl ketone under an applied force of 595 g. No visible yellowing of the coating occurred when the panels were exposed to a temperature of 200° C. for 24 hours or when subjected to ultra-violet radiation (UVB lamps, 290-315 nm) for 7 days.

Similar results were obtained when the coatings on the remaining panels were cured by exposure to a temperature of 175° C. in an air circulating oven for 30 minutes.

EXAMPLE 2

The procedure described in Example 1 was repeated except that the tetra-isopropyl titanate was replaced with tetra-butyl titanate (3 parts) and the butanol content adjusted to 41.4 parts.

Similar results were obtained when the panels were tested for solvent and abrasion resistance, and resistance to yellowing.

EXAMPLE 3

Xylene (35 parts) and n-butanol (23.9 parts) were mixed thoroughly with stirring. To the stirred mixture were then added in turn aluminium acetylacetonate (3 parts), γ-glycidoxypropyl trimethoxysilane (36 parts) and tetraisopropyl titanate (2.1 parts). A portion (20 parts) of the resulting solution was then thoroughly mixed into 100 parts of a 55 percent by weight solvent solution (50/50 butyl cellosolve and xylene) of a siloxane-polyester copolymer. The copolymer had been prepared by the reaction of a methylphenyl siloxane with dimethylterephthalate and trimethylolpropane and contained 5.5% weight of available hydroxyl groups.

The catalysed siloxane-polyester solution thus obtained was applied by dip coating or spraying to degreased panels of glass and aluminium. The coated panels were allowed to air dry for approximately 10 minutes. Some of the panels were then placed in an air circulating oven at 150° C. for 30 minutes to cure the applied coating (thickness 10 microns). When tested for solvent and abrasion resistance the cured coating withstood 200 double rubs with a cloth soaked in methyl ethyl ketone under an applied force of 595g. No visible yellowing of the coating occurred when the panels were exposed to a temperature of 200° C. for 24 hours or when subjected to ultra-violet radiation (UVB lamps, 290-315 nm) for 7 days.

When the coatings on the remaining panels were cured by exposure to a temperature of 120° C. in an air circulating oven for 60 minutes the cured coating withstood 120 double rubs with the weighted, solvent soaked cloth.

EXAMPLE 4

The procedure of Example 3 was repeated employing tetra-butyl titanate (3 parts) in place of the tetraisopropyl titanate. The proportion of n-butanol was also reduced from 23.9 parts to 23 parts.

The catalysed compositions were employed to coat aluminium panels and the applied coatings cured in an air circulating oven at 150° C. for 30 minutes. When tested for solvent and abrasion resistance the cured coatings withstood 200 double rubs with a cloth soaked in methyl ethyl ketone under an applied force of 595 g. No visible yellowing occurred when the panels were exposed to a temperature of 200° C. for 24 hours or to U.V. radiation (UVB, 290-315 nm) for 7 days.

That which is claimed is:

1. A composition which comprises (A) a siloxane-polyester copolymer resin having on average at least two ≡SiOM and/or ≡COH groups per molecule, wherein M represents a hydrogen atom or an alkyl group having from 1 to 4 inclusive carbon atoms, (B) one or more solvents for the siloxane-polyester copolymer, (C) a silane of the general formula

wherein Z represents an organic group composed of carbon, hydrogen and oxygen having therein at least one group of the formula

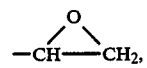

X represents a methyl or a phenyl group, Y represents an alkyl or an alkoxyalkyl group having less than 5 carbon atoms and a has a value of 0 or 1, (D) aluminium acetylacetonate and (E) a tetraalkyl titanate.

2. A composition as claimed in claim 1 wherein the siloxane-polyester copolymer (A) comprises from 35 to 80% by weight of siloxane and from 65 to 20% by weight of polyester.

3. A composition as claimed in claim 1 wherein the solvent (B) is selected from ethers of ethylene glycol, ethers of propylene glycol, hydrocarbons and mixtures thereof.

4. A composition as claimed in claim 1 which contains from 3 to 25% by weight of silane (C), from 0.2 to 2.5% by weight of aluminium acetylacetonate (D) and from 0.25 to 5% by weight of the tetraalkyl titanate (E), all based on the weight of the siloxane-polyester copolymer (A).

5. A process for coating a substrate which comprises applying to the substrate a composition as claimed in claim 1 and thereafter curing the composition by exposure to a temperature of at least 120° C.

6. A substrate having thereon a coating of the cured composition of claim 1.

* * * * *